(12) United States Patent
Vasudevan et al.

(10) Patent No.: US 12,494,043 B2
(45) Date of Patent: Dec. 9, 2025

(54) METHOD AND SYSTEM FOR DEEP LEARNING BASED IMAGE FEATURE EXTRACTION

(71) Applicant: Tata Consultancy Services Limited, Mumbai (IN)

(72) Inventors: Bagya Lakshmi Vasudevan, Chennai (IN); Kalyan Prakash Baishya, Pune (IN); Gaurav Sharma, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 274 days.

(21) Appl. No.: 18/218,349

(22) Filed: Jul. 5, 2023

(65) Prior Publication Data

US 2024/0013516 A1    Jan. 11, 2024

(30) Foreign Application Priority Data

Jul. 6, 2022    (IN) .............................. 202221036845

(51) Int. Cl.
  *G06V 10/77*    (2022.01)
  *G06V 10/30*    (2022.01)
  (Continued)

(52) U.S. Cl.
  CPC .......... *G06V 10/7715* (2022.01); *G06V 10/30* (2022.01); *G06V 10/32* (2022.01); *G06V 10/774* (2022.01); *G06V 10/82* (2022.01)

(58) Field of Classification Search
  CPC .... G06V 10/7715; G06V 10/30; G06V 10/32; G06V 10/774; G06V 10/82
  See application file for complete search history.

(56) References Cited

U.S. PATENT DOCUMENTS

| 10,646,156 B1 * | 5/2020 | Schnorr ................ G16H 30/40 |
| 2006/0033924 A1 * | 2/2006 | Hill ..................... G01B 9/02022 |
| | | 356/450 |

(Continued)

FOREIGN PATENT DOCUMENTS

| CN | 109284765 A | 1/2019 |
| CN | 113111965 A | 7/2021 |

OTHER PUBLICATIONS

Basirat et al., "S*ReLU: Learning Piecewise Linear Activation Functions via Particle Swarm Optimization," (2021).

(Continued)

*Primary Examiner* — Qun Shen
(74) *Attorney, Agent, or Firm* — Finnegan, Henderson, Farabow, Garrett & Dunner, LLP

(57) ABSTRACT

The present disclosure provides a model for deep learning based image feature extraction considering a range of useful negative features. Conventional methods are either considering only positive features or considering all negative features along with positive features which leads to bias in feature extraction. The present disclosure overcomes the problem of the conventional methods using a bounded Rectified Linear activation Unit (B-ReLU) activation function based Bounded-Rectifier Network (B-RectNet). Initially, the present disclosure receives an image pertaining to an object. Further, the received image is preprocessed to remove a plurality of anomalies associated with the image a preprocessing technique. Further, a plurality of image features are extracted based on the preprocessed image using a trained B-RectNet. The bounded ReLU activation function filters a plurality of negative features based on a lower negative bound value and an upper negative bound value before inputting a plurality of feature values to a subsequent layer.

12 Claims, 6 Drawing Sheets

(51) Int. Cl.
  *G06V 10/32*     (2022.01)
  *G06V 10/774*    (2022.01)
  *G06V 10/82*     (2022.01)

(56)         References Cited

U.S. PATENT DOCUMENTS

| | | | | |
|---|---|---|---|---|
| 2015/0015577 | A1* | 1/2015 | Mason | G06T 17/30 |
| | | | | 345/420 |
| 2015/0054824 | A1* | 2/2015 | Jiang | G06F 18/214 |
| | | | | 345/420 |
| 2017/0265786 | A1* | 9/2017 | Fereczkowski | A61B 5/123 |
| 2020/0175352 | A1* | 6/2020 | Cha | G06N 3/04 |
| 2020/0293284 | A1* | 9/2020 | Vantrease | G06N 3/08 |
| 2021/0034848 | A1* | 2/2021 | Hébert | G06V 10/82 |
| 2022/0237457 | A1* | 7/2022 | Sundaram | G16B 20/20 |

OTHER PUBLICATIONS

Chieng et al., "Flatten-T Swish: a thresholded ReLU-Swish-like activation function for deep learning," International Journal of Advances in Intelligent Informatics, 4(2):76-86 (2018).

Kim et al., "Elastic exponential linear units for convolutional neural networks," Neurocomputing 406:253-266 (2020).

Qiu et al., "FReLU: Flexible Rectified Linear Units for Improving Convolutional Neural Networks," (2018).

\* cited by examiner

METHOD AND SYSTEM FOR DEEP LEARNING BASED IMAGE FEATURE EXTRACTION

PRIORITY CLAIM

This U.S. patent application claims priority under 35 U.S.C. § 119 to: India Application No. 202221036845, filed on Jul. 6, 2022. The entire contents of the aforementioned application are incorporated herein by reference.

TECHNICAL FIELD

The disclosure herein generally relates to the field of computer vision and, more particularly, to a method and system for Deep Learning (DL) based image feature extraction.

BACKGROUND

Image feature extraction is a part of dimensionality reduction process and it plays a vital role in image classification applications. The feature extraction process transforms raw data into numerical features that can be further processed while preserving the information in the original data set. Mostly, the dimensionality reduction property of feature extraction without losing original information helps in building models with less machine effort. Further, it increases the speed of learning and generalization in machine learning based applications.

Conventionally, image features are extracted either by using statistical methods or Deep Learning (DL) models. DL based feature extraction methods are providing better results due to their complex architecture. However, training the DL models to discriminate the inputs based on their features is a key challenge. Further, the DL models are facing challenges like, being limited to processing of grayscale images, limited to processing of low resolution images and overfitting. Moreover, most of the conventional DL based methods are either considering only positive features or considering all negative features along with positive features which leads to bias in feature extraction. Hence there is a challenge in developing an accurate DL based image feature extraction technique with minimum overfitting.

SUMMARY

Embodiments of the present disclosure present technological improvements as solutions to one or more of the above-mentioned technical problems recognized by the inventors in conventional systems. For example, in one embodiment, a method for DL based image feature extraction is provided. The method includes receiving by one or more hardware processors, an image pertaining to an object. Further, the method includes preprocessing, by the one or more hardware processors, the image using a preprocessing technique, wherein the preprocessing technique removes a plurality of anomalies associated with the image, wherein the method of preprocessing comprises image reshaping, noise removal and duplet data generation. Finally, the method includes extracting, by the one or more hardware processors, a plurality of image features based on the preprocessed image using a trained bounded Rectified Linear activation Unit (ReLU) based Bounded-Rectifier Network (B-RectNet). The bounded ReLU based B-RectNet comprises an input layer, a plurality of hidden layers and a plurality of output layers, wherein the plurality of hidden layers comprises a plurality of blocks. Each of the plurality of blocks comprises a plurality of modules, wherein each of the plurality of modules comprises at least one of a convolution layer, a batch normalization layer, a pooling layer, a bounded ReLU activation layer, a rescaling layer, and a zero padding layer. The bounded ReLU activation layer filters a plurality of negative features based on a lower negative bound value and an upper negative bound value before inputting a plurality of current feature values to a subsequent layer. The lower negative bound value and the upper negative bound value is selected based on a complexity associated with the image application.

In another aspect, a system for DL based image feature extraction is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an image pertaining to an object. Further, the one or more hardware processors are configured by the programmed instructions to preprocess the image using a preprocessing technique, wherein the preprocessing technique removes a plurality of anomalies associated with the image, wherein the method of preprocessing comprises image reshaping, noise removal and duplet data generation. Finally, the one or more hardware processors are configured by the programmed instructions to extract a plurality of image features based on the preprocessed image using a trained bounded Rectified Linear activation Unit (ReLU) based Bounded-Rectifier Network (B-RectNet). The bounded ReLU based B-RectNet comprises an input layer, a plurality of hidden layers and a plurality of output layers, wherein the plurality of hidden layers comprises a plurality of blocks. Each of the plurality of blocks comprises a plurality of modules, wherein each of the plurality of modules comprises at least one of a convolution layer, a batch normalization layer, a pooling layer, a bounded ReLU activation layer, a rescaling layer, and a zero padding layer. The bounded ReLU activation layer filters a plurality of negative features based on a lower negative bound value and an upper negative bound value before inputting a plurality of current feature values to a subsequent layer. The lower negative bound value and the upper negative bound value is selected based on a complexity associated with the image application.

In yet another aspect, a computer program product including a non-transitory computer-readable medium having embodied therein a computer program for DL based image feature extraction is provided. The computer readable program, when executed on a computing device, causes the computing device to receive an image pertaining to an object. Further, the computer readable program, when executed on a computing device, causes the computing device to preprocess the image using a preprocessing technique, wherein the preprocessing technique removes a plurality of anomalies associated with the image, wherein the method of preprocessing comprises image reshaping, noise removal and duplet data generation. Finally, the computer readable program, when executed on a computing device, causes the computing device to extract a plurality of image features based on the preprocessed image using a trained bounded Rectified Linear activation Unit (ReLU) based Bounded-Rectifier Network (B-RectNet). The bounded ReLU based B-RectNet comprises an input layer, a plurality of hidden layers and a plurality of output layers, wherein the plurality of hidden layers comprises a plurality of blocks. Each of the plurality of blocks comprises a plurality of modules, wherein each of the plurality of modules comprises at least one of a convolution layer, a batch normalization layer, a pooling layer, a bounded ReLU activation layer, a rescaling layer, and a zero padding layer. The bounded ReLU activation layer filters a plurality of negative features based on a lower negative bound value and an upper negative bound value before inputting a plurality of current feature values to a subsequent layer. The lower negative bound value and the upper negative bound value is selected based on a complexity associated with the image application It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
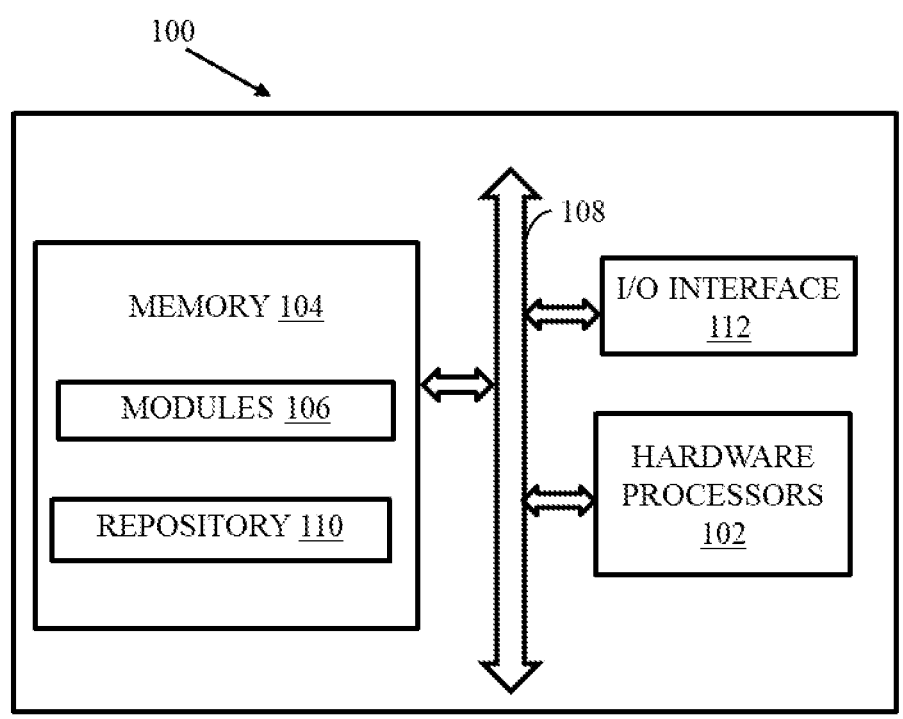
FIG. 1 is a functional block diagram of a system for Deep Learning (DL) based image feature extraction, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The conventional statistical models being used for image feature extraction fail to extract complex features and the conventional neural network architectures like Deep Learning (DL) models are facing challenges like, being limited to processing of grayscale images, limited to processing of low resolution images and overfitting. Moreover, most of the conventional DL based methods are either considering only positive features or considering all negative features along with positive features which leads to bias in feature extraction. Hence there is a challenge in developing an accurate DL based feature extraction technique with minimum overfitting.

Embodiments herein provide a method and system for DL based image feature extraction. The present disclosure provides a complex deep learning architecture with bounded Rectified Linear activation Unit (ReLU) activation function in the hidden layers. Initially, the system receives an image pertaining to an object. Further, the received image is preprocessed to remove a plurality of anomalies associated with the image a preprocessing technique. Further, a plurality of image features are extracted based on the preprocessed image using a trained bounded Rectified Linear activation Unit (ReLU) based Bounded-Rectifier Network (B-RectNet). A plurality of hidden layers of the B-RectNet includes a bounded ReLU activation layer which filters a plurality of negative features based on a lower negative bound value and an upper negative bound value before inputting a plurality of current feature values to a subsequent layer. The lower negative bound value and the upper negative bound value is selected based on a complexity associated with the image application.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a Deep Learning (DL) based image feature extraction, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases. For example, other devices comprises a plurality of sensors and a plurality of camera.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for DL based image feature extraction. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for DL based image feature extraction.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 2:
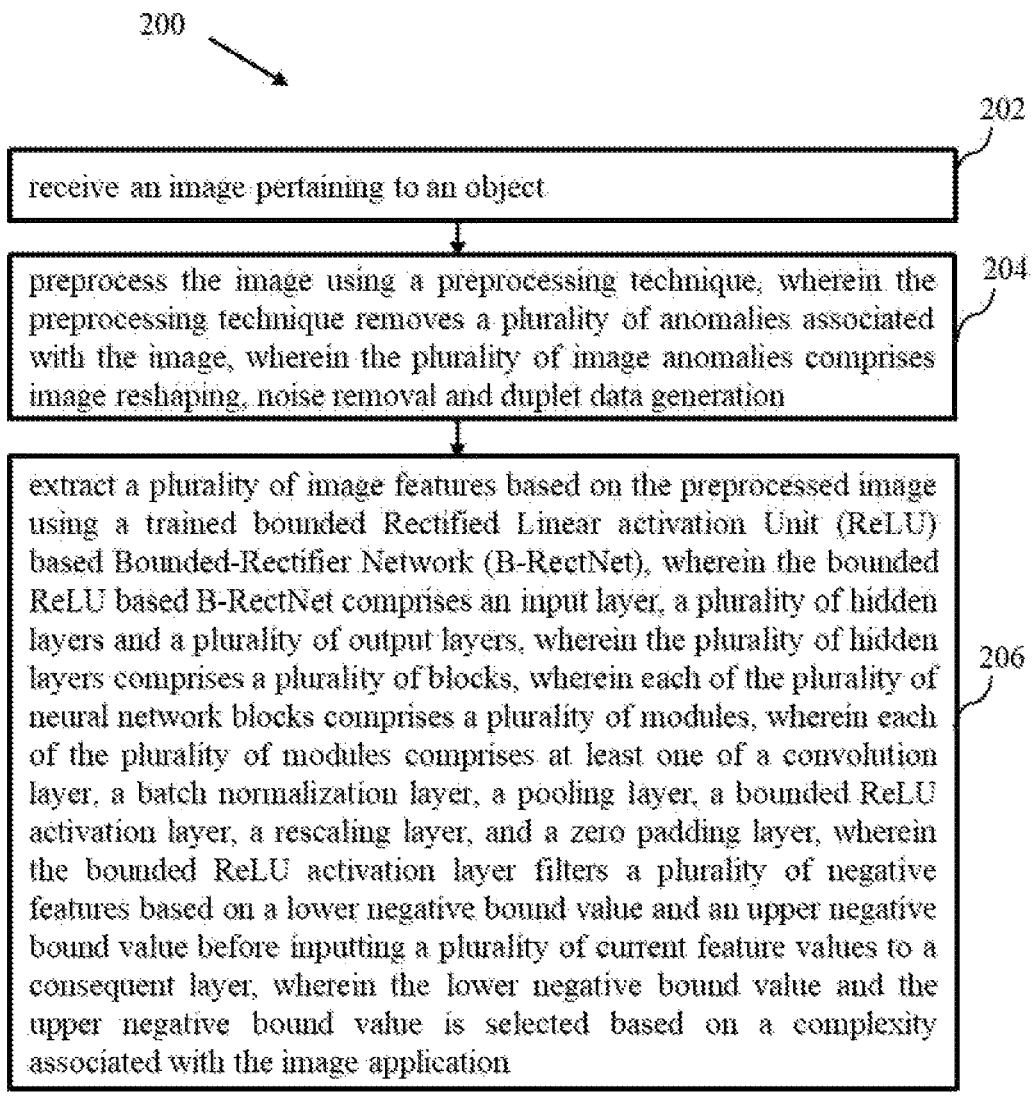
FIG. 2 is an exemplary flow diagram illustrating a processor implemented method for DL based image feature extraction, implemented by the system of FIG. 1, in accordance with some embodiments of the present disclosure.

FIG. 2 is an exemplary flow diagram illustrating a method 200 for DL based image feature extraction implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive an image pertaining to an object. The image can be a colour image, a grey scale image and a black and white image. The image is either received in online mode or offline mode.

At step 204 of the method 200, the one or more hardware processors 102 are configured by the programmed instructions to preprocess the image using the preprocessing technique. In an embodiment, the preprocessing technique removes a plurality of anomalies associated with the image. The preprocessing includes image reshaping, noise removal and duplet data generation. For example, the reshaping image changes dimension of the image and the noise removal enhances image structure at different levels.

In applications which are using two or more sub networks for identifying feature similarity of two images, a duplet data should be passed to indicate to the model whether the two images are similar or not. In such cases, duplet data is used. For example, when two similar images are passed, the target label for duplet data is set to 1 and zero otherwise.

At step 206 of the method 200, the one or more hardware processors 102 are configured by the programmed instructions to extract the plurality of image features based on the preprocessed image using the trained B-RectNet. Steps involved in the process of extracting the plurality of images using the trained B-RectNet are explained with reference to the functional architectures in FIGS. 3A through 3D.

Figure 3A:
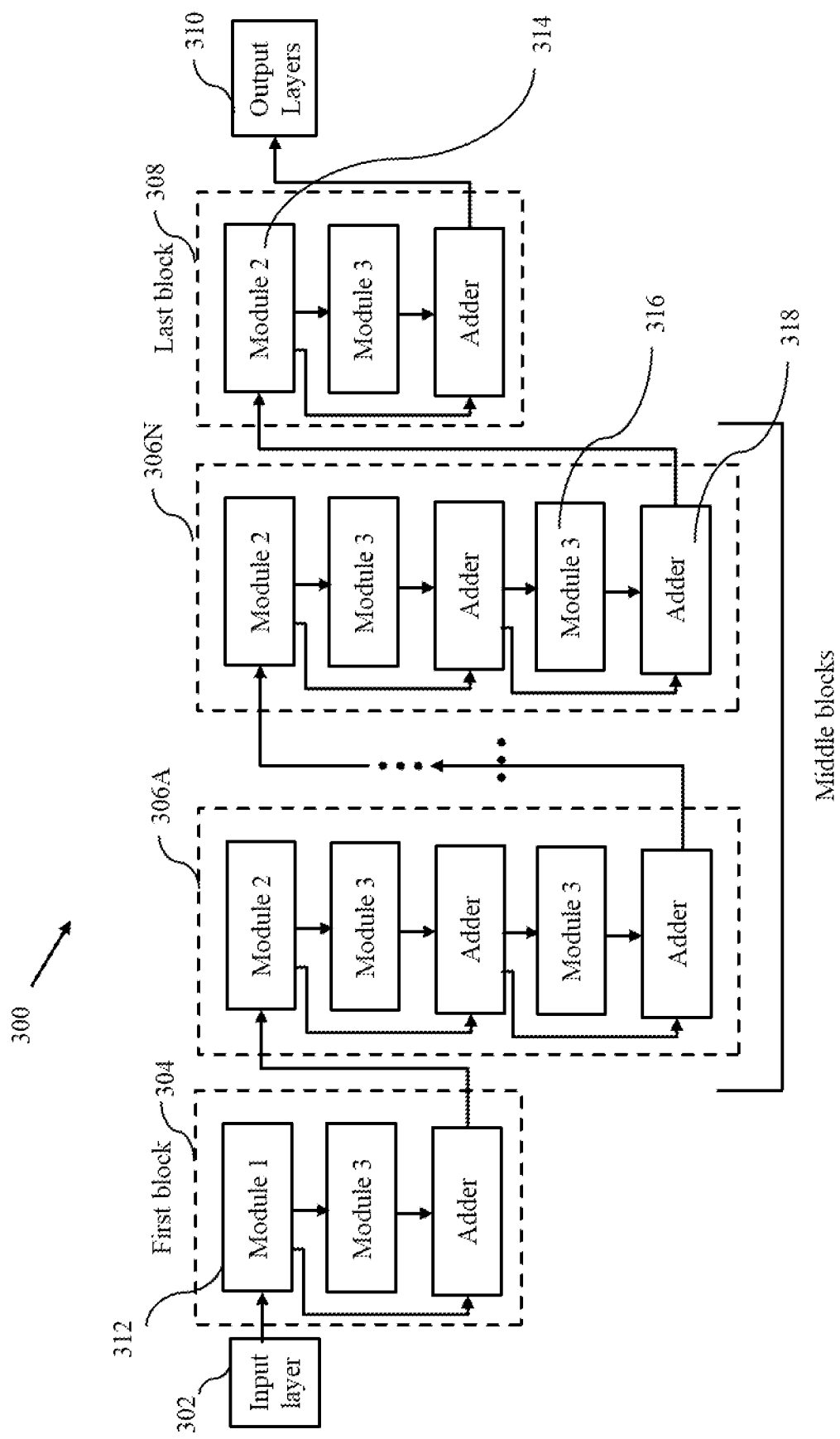
FIGS. 3A through 3D illustrate functional architectures of the system of FIG. 1, for the DL based image feature extraction, in accordance with some embodiments of the present disclosure.
Figure 3B:
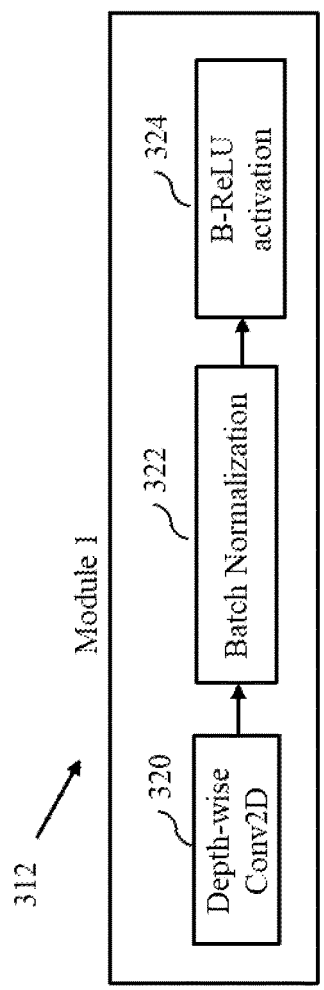
Figure 3C:
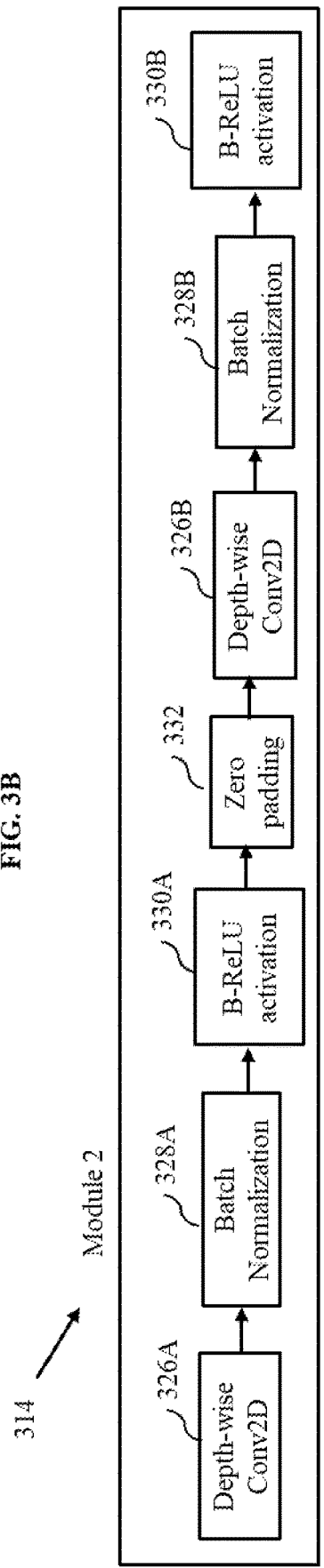
Figure 3D:
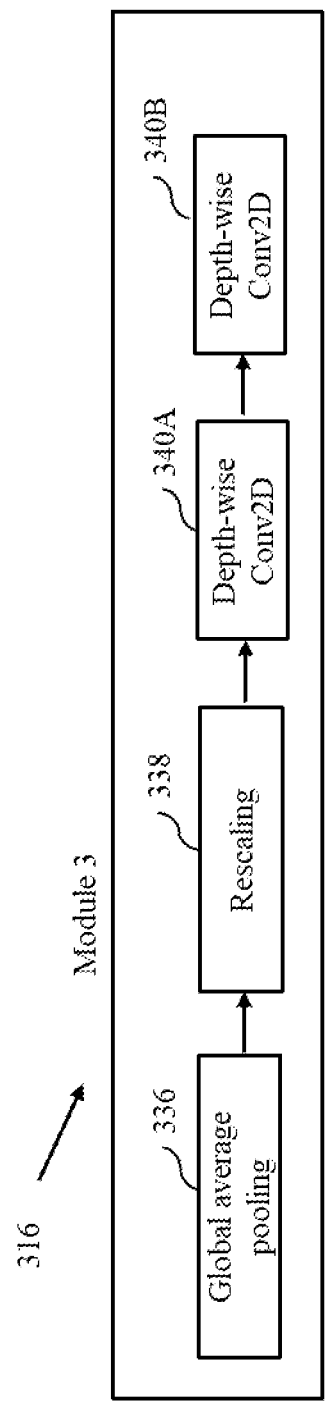

FIGS. 3A through 3D illustrate functional architectures of the system of FIG. 1, for DL based image feature extraction, in accordance with some embodiments of the present disclosure. Now referring to FIG. 3A, the B-RectNet includes an input layer 302, a plurality of hidden layers (304, 306A to 306N, 308), a plurality of output layers 310. The plurality of hidden layers comprises a first block, middle blocks and last block. Each of the plurality of blocks comprises a plurality of modules like a first module 312 (module 1 shown in FIG. 3A), a second module 314 (module 2 shown in FIG. 3A) and a third module 316 (module 3 shown in FIG. 3A). Each of the plurality of modules includes at least one of a convolution layer, a batch normalization layer, a pooling layer, a bounded ReLU activation layer, a rescaling layer, and a zero padding layer as shown in FIGS. 3B through 3D. The bounded ReLU activation layer filters the plurality of negative features based on the lower negative bound value and the upper negative bound value before inputting a plurality of current feature values to the subsequent layer. The lower negative bound value and the upper negative bound value is selected based on the complexity associated with the image application.

In an embodiment, for simple classification problems, where the number of negative features is less than a predefined lower threshold, lower negative bound is set near to 0. For Multi-Label feature generation, where the number of negative features generated are greater than a predefined upper threshold, lower negative bound can vary up to −60 and as model converse this can vary.

In an embodiment, the first block 304 of the FIG. 3A includes the first module 312, the third module 316 and an adder 318. The adder 318 passes the output of the first block 304 to a first middle block 306 A. The middle blocks 306 A through 306 N includes the second module 314, followed by one or more third modules 316. The one or more third modules are connected by the adder 318. Each block is connected with the subsequent block using a corresponding adder. The last block 308 includes the third module 316 and the second module 34. The adder associated with the last block passes the output of the last block 308 to the plurality of output layers 310.

Now referring to FIG. 36, the first module 312 includes a Depth-wise convolutional 2D layer 320, a batch normalization layer 322 and a B-ReLU activation layer 324. The layers explained in conjunction with FIGS. 3B through 3D are exemplary and any new layer can be added or removed based on the application.

Now referring to FIG. 3C, the second module 314 includes the Depth-wise convolutional 2D layer 326A, a batch normalization layer 328A, a B-ReLU activation layer 330A, a zero padding layer 332, a depth-wise convolution 2D layer 326B, a batch normalization layer 328B and a B-ReLU activation layer 330B.

Now referring to FIG. 3D, the third module 316 includes a global average pooling layer 336, a rescaling layer 338, a depth-wise convolution 2D layers 340A and 340B.

In an embodiment, a depth-wise convolution 2D is performed in the convolution layers (320, 326A, 3266, 340A, 340N) of the architectures of FIG. 3B to FIG. 3D of the present disclosure to reduce overfitting due to large number of features. In the depth-wise convolution, each filter channel is used only at one input channel. For example, if there are 3 channel filters and 3 channel images, the filter and image is split into three different channels. The image is convolved further with the corresponding split up channel and then wrapped back. For example, a 3×3 depth-wise convolution feature vector is shown in equation (1)

$$DepthConv2D(3x3\ kernel = \begin{bmatrix} -34.643 & -65.246 & -15.652 \\ -86.435 & -0.386 & -20.050 \\ -12.894 & -28.879 & -65.980 \end{bmatrix} \quad (1)$$

In an embodiment, the batch normalization layer (322, 328A, 328B) of the architectures of FIG. 3B through FIG. 3D, receives the outputs from the first hidden layer and normalize them before passing them on as the input of the next hidden layer. The normalization process includes computing mean and variance initially and further normalizing using the equation (2). The feature vector after batch normalization using equation (2) is shown in equation (3). The left matrix of the equation (3) indicates the feature vector before normalization and the right matrix indicates the feature vector after convolution.

$$Yi = \frac{X_i - Mean_i}{StdDev_i} \quad (2)$$

$$\begin{bmatrix} -34.643 & -65.246 & -15.652 \\ -86.435 & -0.386 & -20.050 \\ -12.894 & -28.879 & -65.980 \end{bmatrix} => \begin{bmatrix} 0.3246 & -1.271 & 0.801 \\ -1.354 & 1.172 & 0.608 \\ 1.0297 & 0.098 & -1.409 \end{bmatrix} \quad (3)$$

In an embodiment, the B-ReLU activation function (324, 330A, 330B) of the present disclosure is given in equation (4). Now referring to equation (4), if β=0, F becomes ReLU. In an embodiment, if β>0 & k<0, then F becomes Static B-ReLU (Similar to Leaky ReLU but with range. In an embodiment, if β is a learnable parameter, with k<0, F Becomes Dynamic B-ReLU.

$$F(x) = \begin{cases} x, & \text{if } x > 0 \\ \beta x, & \text{if } x \in [0, k] \\ 0, & \text{otherwise} \end{cases} \quad (4)$$

The equation (4) can also be written as given in equation (5). The gradient for back propagation is given in equation (6).

$$F(x) = \max(0, x) + \beta \min(0, x) \quad (5)$$

$$\frac{\partial f(x)}{\partial \beta} = \begin{cases} 0, & \text{if } x > 0 \\ \beta, & \text{if } x \text{ in } [0, k] \end{cases} \quad (6)$$

In an embodiment, the output of the B-ReLU function after normalization is given in equation (7). The B-ReLU after including P on negative features is given in equation (8).

$$B-ReLU\ (k = (-1.3, 0]) = \begin{bmatrix} 0.3246 & -1.271 & 0.801 \\ 0 & 1.172 & 0.608 \\ 1.0297 & 0.098 & 0 \end{bmatrix} \quad (7)$$

$$B-ReLU, \beta = 0.5,) = \begin{bmatrix} 0.3246 & -1.271 & 0.801 \\ 0 & 1.172 & 0.608 \\ 1.0297 & 0.098 & 0 \end{bmatrix} \quad (8)$$

Figure 4:
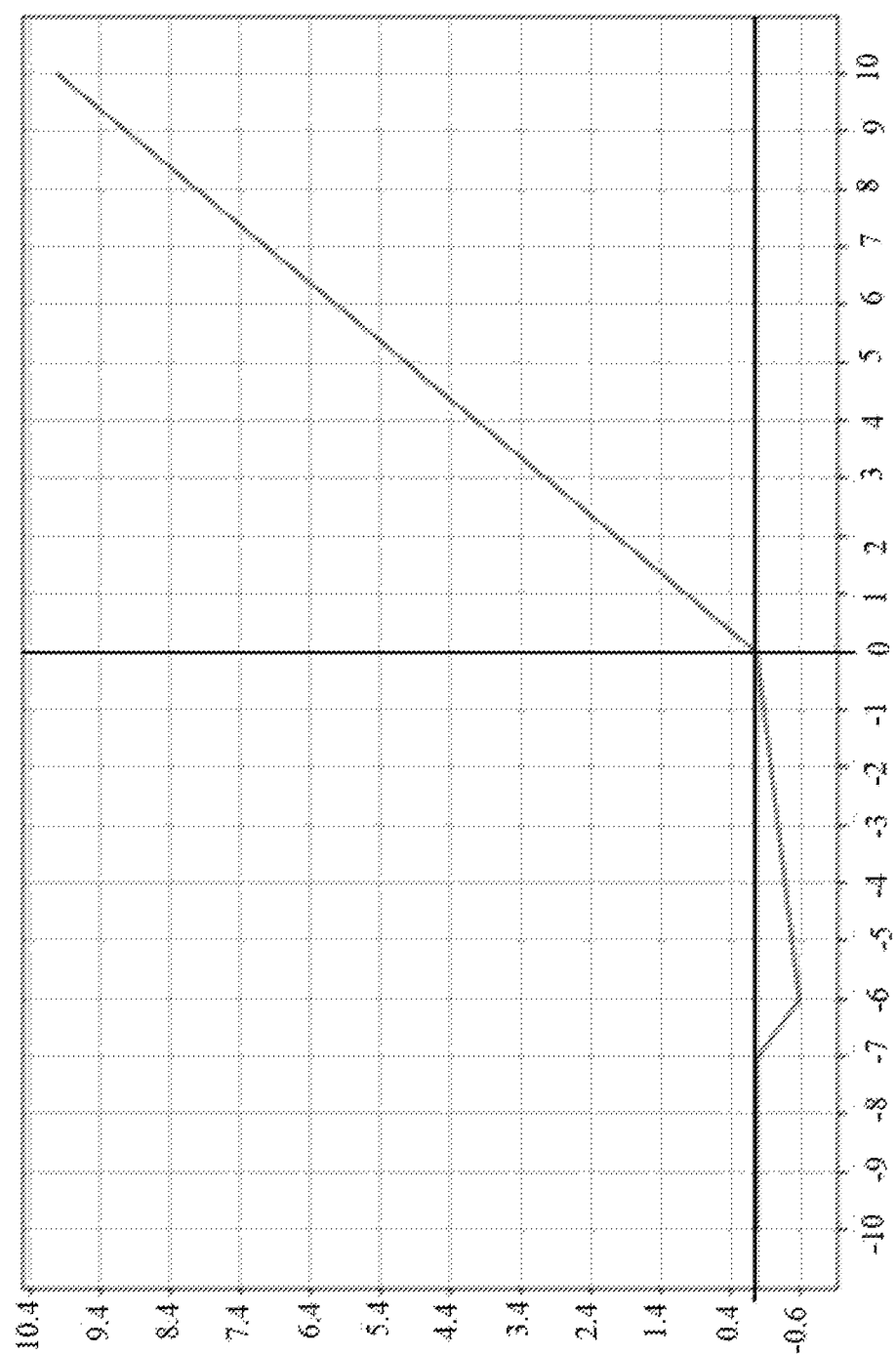
FIG. 4 illustrates a bounded Rectified Linear activation Unit (ReLU) function for the processor implemented method for DL based image feature extraction, implemented by the system of FIG. 1, in accordance with some embodiments of the present disclosure.

FIG. 4 illustrates an example bounded Rectified Linear activation Unit (ReLU) activation function for the processor implemented method for DL based image feature extraction, implemented by the system of FIG. 1, in accordance with some embodiments of the present disclosure. Now referring to FIG. 4, x-axis holds the input feature values and y-axis holds the function output for each corresponding input value. For positive features, y=x and for negative features, the range is in (0,k], that is (0,−6].

The batch normalization process helps in preserving some features which would be lost otherwise. For example, in the above illustration, the output of B-ReLU without normalization is given in equation (9) which indicates that many feature values are zero which means, some features are lost.

$$B-ReLU\ (k = (-50.0, 0]) = \begin{bmatrix} -34.643 & 0 & -15.652 \\ 0 & -0.386 & -20.050 \\ -12.894 & -28.879 & 0 \end{bmatrix} \quad (9)$$

In an embodiment, the global average pooling layer 336 of the present disclosure reduces the dimension of the feature map. The global average pooling layer generates one feature map for each category of classification task. This layer doesn't add fully connected layer but takes the average of each feature map and the resulting vector is fed to the next layer. This is native to the convolution structure & also no parameter to optimize in between. Hence, overfitting is avoided in this layer. In an embodiment, the rescaling layer 338 of the present disclosure rescales every value of an input by multiplying a scale and adding offset.

In an embodiment, the zero padding layer 332 of the present disclosure controls the shrink of dimension after larger filter operations on previous layers. This also allows more space for the filter to cover in the image array. For example, the feature vector after zero padding is given in equation (10).

$$\begin{bmatrix} 0.3246 & -0.6355 & 0.801 \\ 0 & 1.172 & 0.608 \\ 1.0297 & 0.098 & 0 \end{bmatrix} = \begin{cases} 0 & 0 & 0 & 0 & 0 \\ 0 & 0.3246 & -0.6355 & 0.801 & 0 \\ 0 & 0 & 1,172 & 0.608 & 0 \\ 0 & 1.0297 & 0.098 & 0 & 0 \\ 0 & 0 & 0 & 0 & 0 \end{cases} \quad (10)$$

In an embodiment, the B-RectNet is trained as explained below: Initially, a plurality of images are received from an image database. The plurality of images are further preprocessed to remove the plurality anomalies associated with the image. Simultaneously, a plurality of parameters like β & k associated with the B-RectNet are initialized. Further, a plurality of features corresponding to each of the plurality of images are computed using the B-RectNet. Finally, the B-RectNet is optimized until a minimum loss is obtained. The learnt plurality of parameters (β & k) are used while testing the B-RectNet.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of optimal feature extraction considering a range of negative features along with positive features from an image. The approach incorporates the B-RectNet which reduces overfitting problem and enables the processing of high resolution images. Further, the present disclosure utilizes the bounded ReLU activation function which is specifically designed to consider some useful negative features into processing. The B-RectNet along with the specifically designed B-ReLU extracts optimal features from images.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, by one or more hardware processors, an image pertaining to an object;
preprocessing, by the one or more hardware processors, the image using a preprocessing technique, wherein the preprocessing technique removes a plurality of anomalies associated with the image, wherein the method of preprocessing comprises image reshaping, noise removal and duplet data generation; and
extracting, by the one or more hardware processors, a plurality of image features based on the preprocessed image using a trained bounded Rectified Linear activation Unit (ReLU) based Bounded-Rectifier Network (B-RectNet),
wherein training the bounded ReLU based B-RectNet comprises:
receiving a plurality of images from an image database;
preprocessing each of the plurality of images to remove the plurality anomalies associated with the image;
simultaneously initializing a plurality of hyperparameters associated with the bounded ReLU based B-RectNet;
computing a plurality of features corresponding to each of the plurality of images using the bounded ReLU based B-RectNet; and
optimizing the bounded ReLU based B-RectNet until a minimum loss is obtained, wherein the bounded ReLU based B-RectNet comprises an input layer, a plurality of hidden layers and a plurality of output layers, wherein the plurality of hidden layers comprises a plurality of blocks, wherein each of the plurality of blocks comprises a plurality of modules, wherein each of the plurality of modules comprises at least one of a convolution layer, a batch normalization layer, a pooling layer, a bounded ReLU activation layer, a rescaling layer, and a zero padding layer, wherein the bounded ReLU activation layer filters a plurality of negative features based on a lower negative bound value and an upper negative bound value before inputting a plurality of current feature values to a subsequent layer, and wherein the lower negative bound value and the upper negative bound value is selected based on a complexity associated with the image application.

2. The processor implemented method of claim 1, wherein the image is received in one of, an online mode or offline mode.

3. The processor implemented method of claim 1, wherein reshaping image changes dimension of the image.

4. The processor implemented method of claim 1, wherein the lower negative bound value and the upper negative bound value of the B-ReLU are selected based on a plurality of hyperparameters learnt during the training of the B-RectNet.

5. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive an image pertaining to an object;
preprocess the image using a preprocessing technique, wherein the preprocessing technique removes a plurality of anomalies associated with the image, wherein the method of preprocessing comprises image reshaping, noise removal and duplet data generation; and
extract a plurality of image features based on the preprocessed image using a trained bounded Rectified Linear activation Unit (ReLU) based Bounded-Rectifier Network (B-RectNet),
wherein training the bounded ReLU based B-RectNet comprises:
receiving a plurality of images from an image database;
preprocessing each of the plurality of images to remove the plurality anomalies associated with the image;
simultaneously initializing a plurality of hyperparameters associated with the bounded ReLU based B-RectNet;
computing a plurality of features corresponding to each of the plurality of images using the bounded ReLU based B-RectNet; and
optimizing the bounded ReLU based B-RectNet until a minimum loss is obtained,
wherein the bounded ReLU based B-RectNet comprises an input layer, a plurality of hidden layers and a plurality of output layers, wherein the plurality of hidden layers comprises a plurality of blocks,
wherein each of the plurality of blocks comprises a plurality of modules,
wherein each of the plurality of modules comprises at least one of a convolution layer, a batch normalization layer, a pooling layer, a bounded ReLU activation layer, a rescaling layer, and a zero padding layer,
wherein the bounded ReLU activation layer filters a plurality of negative features based on a lower negative bound value and an upper negative bound value before inputting a plurality of current feature values to a subsequent layer, and
wherein the lower negative bound value and the upper negative bound value is selected based on a complexity associated with the image application.

6. The system of claim 5, wherein the image is received in one of, an online mode or offline mode.

7. The system of claim 5, wherein reshaping image changes dimension of the image.

8. The system of claim 5, wherein the lower negative bound value and the upper negative bound value of the B-ReLU are selected based on a plurality of hyperparameters learnt during the training of the B-RectNet.

9. One or more non-transitory machine readable information storage mediums comprising one or more instructions which when executed by one or more hardware processors causes:
receiving an image pertaining to an object;
preprocessing the image using a preprocessing technique, wherein the preprocessing technique removes a plurality of anomalies associated with the image, wherein the method of preprocessing comprises image reshaping, noise removal and duplet data generation; and
extracting a plurality of image features based on the preprocessed image using a trained bounded Rectified Linear activation Unit (ReLU) based Bounded-Rectifier Network (B-RectNet),
wherein training the bounded ReLU based B-RectNet comprises:
receiving a plurality of images from an image database;
preprocessing each of the plurality of images to remove the plurality anomalies associated with the image;
simultaneously initializing a plurality of hyperparameters associated with the bounded ReLU based B-RectNet;
computing a plurality of features corresponding to each of the plurality of images using the bounded ReLU based B-RectNet; and
optimizing the bounded ReLU based B-RectNet until a minimum loss is obtained,
wherein the bounded ReLU based B-RectNet comprises an input layer, a plurality of hidden layers and a plurality of output layers, wherein the plurality of hidden layers comprises a plurality of blocks,
wherein each of the plurality of blocks comprises a plurality of modules, wherein each of the plurality of modules comprises at least one of a convolution layer, a batch normalization layer, a pooling layer, a bounded ReLU activation layer, a rescaling layer, and a zero padding layer,
wherein the bounded ReLU activation layer filters a plurality of negative features based on a lower negative bound value and an upper negative bound value before inputting a plurality of current feature values to a subsequent layer, and wherein the lower negative bound value and the upper negative bound value is selected based on a complexity associated with the image application.

10. The one or more non-transitory machine readable information storage mediums of claim 9, wherein the image is received in one of, an online mode or offline mode.

11. The one or more non-transitory machine readable information storage mediums of claim 9, wherein reshaping image changes dimension of the image.

12. The one or more non-transitory machine readable information storage mediums of claim 9, wherein the lower negative bound value and the upper negative bound value of the B-ReLU are selected based on a plurality of hyperparameters learnt during the training of the B-RectNet.

* * * * *